US011252399B2

(12) United States Patent
Lyon et al.

(10) Patent No.: US 11,252,399 B2
(45) Date of Patent: *Feb. 15, 2022

(54) DETERMINING INTER-PUPILLARY DISTANCE

(71) Applicant: Microsoft Technology Licensing, LLC, Redmond, WA (US)

(72) Inventors: Todd Michael Lyon, Seattle, WA (US); Maria M. Cameron, Seattle, WA (US); Felicia Stephanie Williams, Seattle, WA (US); Scott Petill, Seattle, WA (US); Qi Kuan Zhou, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 517 days.

This patent is subject to a terminal disclaimer.

(21) Appl. No.: 14/724,633

(22) Filed: May 28, 2015

(65) Prior Publication Data
US 2016/0353093 A1  Dec. 1, 2016

(51) Int. Cl.
*H04N 13/327* (2018.01)
*G02B 27/01* (2006.01)
(Continued)

(52) U.S. Cl.
CPC ......... *H04N 13/327* (2018.05); *G02B 27/017* (2013.01); *G02B 27/0189* (2013.01);
(Continued)

(58) Field of Classification Search
CPC .............. G02B 2027/0198; G02B 7/12; G02B 27/017; G02B 27/0101; H04N 13/044;
(Continued)

(56) References Cited

U.S. PATENT DOCUMENTS 4,558,379 A * 12/1985 Hütter et al. .......... G01R 13/06
                                                        360/32
5,293,227 A *  3/1994 Prince .................. H04N 13/341
                                                        348/53
(Continued)

FOREIGN PATENT DOCUMENTS

CA        2217366 A1    3/1999
EP        2765776 A1    8/2014
(Continued)

OTHER PUBLICATIONS

ISA European Patent Office, International Search Report and Written Opinion Issued in Application No. PCT/US2016/030340, dated Jul. 20, 2016, WIPO, 12 Pages.
(Continued)

*Primary Examiner* — Daniel Chang
(74) *Attorney, Agent, or Firm* — Alleman Hall Creasman & Tuttle LLP

(57) ABSTRACT

A head-mounted display device is disclosed that includes an at least partially see-though display, a processor, and a non-volatile storage device holding instructions executable by the processor to: select an image that corresponds to a physical object viewable by the user; display the image at a perceived offset to the physical object; in response to alignment user input, move a perceived position of the image relative to the physical object; output an instruction to provide completion user input when the image appears to align with the physical object; when the completion user input is received, determine the inter-pupillary distance of the user; and calibrate the head mounted display device based on the inter-pupillary distance.

18 Claims, 12 Drawing Sheets

(51) Int. Cl.
*H04N 13/366* (2018.01)
*G02B 7/12* (2021.01)

(52) U.S. Cl.
CPC .............. *H04N 13/366* (2018.05); *G02B 7/12* (2013.01); *G02B 2027/0129* (2013.01); *G02B 2027/0138* (2013.01); *G02B 2027/0141* (2013.01); *G02B 2027/0178* (2013.01); *G02B 2027/0198* (2013.01)

(58) Field of Classification Search
CPC .............. H04N 13/004; H04N 13/0425; H04N 13/0468; H04N 13/0497; H04N 21/25891; G06T 19/006; G06F 3/013; G06F 3/011
USPC .......... 345/7, 173, 633, 207, 8; 348/53, 158; 463/31, 32; 250/234
See application file for complete search history.

(56) References Cited

U.S. PATENT DOCUMENTS

| | | | |
|---|---|---|---|
| 5,446,834 A | 8/1995 | Deering | |
| 5,822,032 A | 10/1998 | Edwards et al. | |
| 5,990,935 A | 11/1999 | Rohlfing | |
| 6,879,443 B2 | 4/2005 | Spitzer et al. | |
| 8,459,792 B2 | 6/2013 | Wilson et al. | |
| 8,581,905 B2 | 11/2013 | Mitchell | |
| 8,665,177 B2 | 3/2014 | Herrmann et al. | |
| 8,786,675 B2 | 7/2014 | Deering | |
| 9,911,236 B2* | 3/2018 | Bar-Zeev | G06T 19/006 |
| 2003/0085866 A1* | 5/2003 | Bimber | G05B 19/186 |
| | | | 345/156 |
| 2004/0150888 A1* | 8/2004 | Domjan | G02B 30/34 |
| | | | 359/630 |
| 2006/0152434 A1 | 7/2006 | Sauer et al. | |
| 2006/0244820 A1* | 11/2006 | Morita | G06T 19/006 |
| | | | 348/14.13 |
| 2010/0097671 A1 | 4/2010 | Leister | |
| 2010/0295929 A1* | 11/2010 | Yoshifuji | H04N 13/398 |
| | | | 348/53 |
| 2011/0075257 A1* | 3/2011 | Hua | H04N 13/322 |
| | | | 359/464 |
| 2011/0149052 A1* | 6/2011 | Bai | G06F 3/147 |
| | | | 348/54 |
| 2011/0249122 A1* | 10/2011 | Tricoukes | G02B 27/017 |
| | | | 348/158 |
| 2011/0254933 A1* | 10/2011 | Seo | H04N 13/341 |
| | | | 348/56 |
| 2011/0304647 A1 | 12/2011 | Noge | |
| 2012/0068913 A1 | 3/2012 | Bar-zeev et al. | |
| 2012/0081800 A1* | 4/2012 | Cheng | G03B 21/00 |
| | | | 359/720 |
| 2012/0108328 A1* | 5/2012 | Konno | H04N 13/0497 |
| | | | 463/31 |
| 2012/0120103 A1* | 5/2012 | Border | G02B 27/017 |
| | | | 345/633 |
| 2012/0154557 A1* | 6/2012 | Perez | H04N 21/25891 |
| | | | 348/53 |
| 2012/0256956 A1* | 10/2012 | Kasahara | G06F 3/14 |
| | | | 345/633 |
| 2013/0050642 A1 | 2/2013 | Lewis et al. | |
| 2013/0063431 A1* | 3/2013 | Park | H04N 13/315 |
| | | | 345/419 |
| 2013/0063486 A1 | 3/2013 | Braun et al. | |
| 2013/0088413 A1* | 4/2013 | Raffle | G02B 27/0101 |
| | | | 345/7 |
| 2013/0113784 A1 | 5/2013 | White et al. | |
| 2013/0141421 A1 | 6/2013 | Mount et al. | |
| 2013/0169560 A1* | 7/2013 | Cederlund | G06F 3/013 |
| | | | 345/173 |
| 2013/0169683 A1 | 7/2013 | Perez et al. | |
| 2013/0194164 A1* | 8/2013 | Sugden | G02B 27/017 |
| | | | 345/8 |
| 2013/0208014 A1* | 8/2013 | Fleck | G06K 9/00684 |
| | | | 345/672 |
| 2013/0234914 A1* | 9/2013 | Fujimaki | G06F 3/011 |
| | | | 345/8 |
| 2013/0318776 A1* | 12/2013 | Jacobs | G06F 3/013 |
| | | | 29/592.1 |
| 2013/0321255 A1 | 12/2013 | Lamb et al. | |
| 2014/0002442 A1 | 1/2014 | Lamb et al. | |
| 2014/0152531 A1* | 6/2014 | Murray | G06F 3/012 |
| | | | 345/8 |
| 2014/0152558 A1 | 6/2014 | Salter | |
| 2014/0218291 A1 | 8/2014 | Kirk | |
| 2014/0266987 A1 | 9/2014 | Magyari | |
| 2014/0274391 A1* | 9/2014 | Stafford | G06F 3/013 |
| | | | 463/32 |
| 2014/0333665 A1 | 11/2014 | Sylvan et al. | |
| 2014/0333667 A1 | 11/2014 | Jung et al. | |
| 2015/0198808 A1 | 7/2015 | Morifuji et al. | |
| 2016/0091720 A1 | 3/2016 | Stafford et al. | |
| 2016/0349510 A1 | 12/2016 | Miller et al. | |
| 2017/0227686 A1* | 8/2017 | Price | G02B 27/0172 |
| 2017/0359572 A1* | 12/2017 | Choi | H04N 13/341 |

FOREIGN PATENT DOCUMENTS

| | | |
|---|---|---|
| JP | 4743818 B2 | 8/2011 |
| WO | 2004113991 A2 | 12/2004 |
| WO | 2007084943 A2 | 7/2007 |
| WO | 2012062681 A1 | 5/2012 |
| WO | 2014155072 A2 | 10/2014 |

OTHER PUBLICATIONS

"How to Measure Your IPD", Published on: Apr. 9, 2014, Available at: http://doc-ok.org/?p=898#more-898.

Lang, Ben, "How to Measure Your IPD and Create a VR Player Profile with the New Oculus Configuration Utility", Published on: Jul. 16, 2013, Available at: http://www.roadtovr.com/measure-ipd-oculus-rift-configuration-utility/.

Bruder, et al., "Estimation of Virtual Interpupillary Distances for Immersive Head-Mounted Displays", In Proceedings of the 7th Symposium on Applied Perception in Graphics and Visualization, Jul. 23, 2010, pp. 168.

"How to Measure Your IPD with a Mirror", Published on: Jul. 29, 2013, Available at: http://www.mtbs3d.com/wiki/index.php?title=How_to_measure_your_IPD_with_a_mirror.

IPEA European Patent Office, Second Written Opinion Issued in PCT/Application No. PCT/US2016/030340, dated May 3, 2017, WIPO, 6 Pages.

"SDK C API Overview", In White Paper of Oculus VR, Inc., Apr. 14, 2014, 24 Pages.

"Non Final Office Action Issued in U.S. Appl. No. 14/724,486", dated Nov. 28, 2016, 9 Pages.

Wilson, et al., "Steerable Augmented Reality with the Beamatron", In Proceedings of the 25th Annual ACM Symposium on User Interface Software and Technology (USIt), Oct. 7, 2012, 10 Pages.

Aliaga, Daniel G.,"Virtual and Real Object Collisions in a Merged Environment", In Master Thesis submitted to University of North Carolina, 1993, 59 Pages.

Antonov, et al., "SDK Overview SDK Version 0.2.5", In White Paper of Oculus VR, Inc., Oct. 9, 2013, 49 Pages.

Azuma, et al., "Improving Static and Dynamic Registration in an Optical See-through HMD", In Proceedings of the 21st Annual Conference on Computer Graphics and Interactive Techniques, Jul. 24, 1994, 17 Pages.

Best, Scot, "Perceptual and Oculomotor Implications of Interpupillary Distance Settings on a Head-Mounted Virtual Display", In Proceedings of the IEEE National Aerospace and Electronics Conference, vol. 1, May 20, 1996, pp. 429-434.

Davis, Brad, "Understanding Matrix Transformations for Rendering to the Oculus Rift", Retrieved From: http://rifty-business.blogspot.com/2013/10/understanding-matrix-transformations.html, Oct. 14, 2013, 3 Pages.

(56) References Cited

OTHER PUBLICATIONS

Duchowski, et al., "Binocular Eye Tracking in VR for Visual Inspection Training", In Proceedings of the ACM symposium on Virtual reality software and technology, Nov. 15, 2001, 8 Pages.

Li, et al., "Minication Affects Action-Based Distance Judgments in Oculus Rift HMDs", In Proceedings of the ACM Symposium on Applied Perception, Aug. 8, 2014, pp. 91-94.

Liu, et al., "An Optical See-Through Head Mounted Display with Addressable Focal Planes", In Proceedings of IEEE International Symposium on Mixed and Augmented Reality, Sep. 15, 2008, pp. 33-42.

"Second Written Opinion Issued in PCT Application No. PCT/US2016/030337", dated Apr. 11, 2017, 7 Pages.

"International Search Report and Written Opinion Issued in PCT Application No. PCT/US2016/030337", dated Sep. 6, 2016, pp. 16.

Steptoe, William, "William Steptoe- AR-Rift: Aligning Tracking and Video Spaces", Retrieved From: https://web.archive.org/web/20131127085951/http://willsteptoe.com/, Nov. 27, 2013, 22 Pages.

Whiting, Nick, "Integrating the Oculus Rift into Unreal Engine 4", Retrieved From: http://gamasutra.com/blogs/NickWhiting/20130611/194007/Integrating_the_Oculus_Rift_into_Unreal_Engine_4.php, Jun. 11, 2013, 7 Pages.

\* cited by examiner

Voice Over: "Okay. Now say 'left', 'right', 'up', or 'down' to move the image into line with the object."

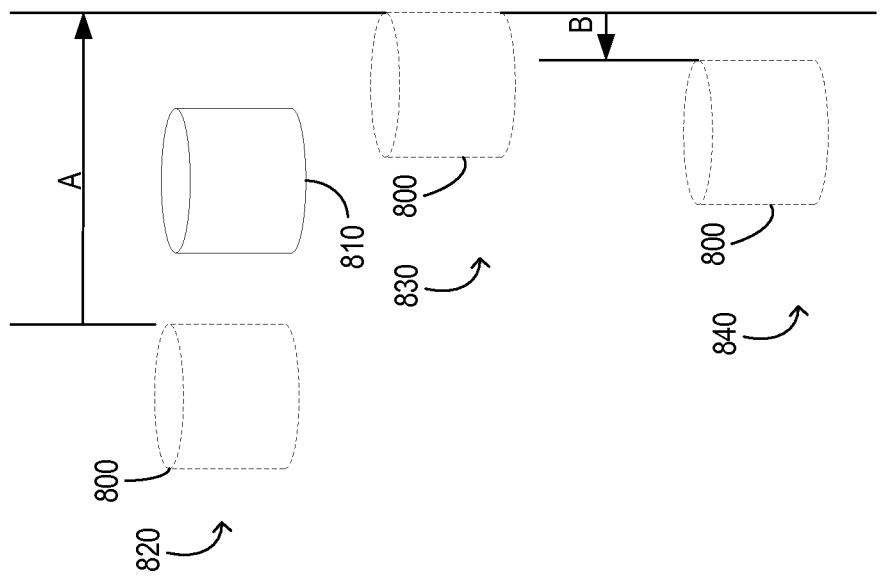
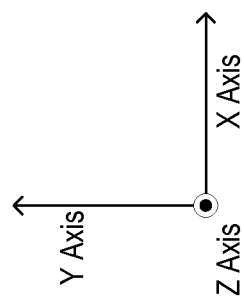
FIG. 8

DETERMINING INTER-PUPILLARY DISTANCE

BACKGROUND

Recently, various technologies have emerged that allow users to experience a blend of reality and virtual worlds. For example, head-mounted display (HMD) devices may include high definition cameras, depth cameras, range finders, gyroscopes, accelerometers, and other technologies that allow the HMD device to map the real world and to display a blend of reality and virtual objects on the HMD device.

These HMD devices may include stereoscopic displays that use stereopsis to achieve 3D visuals by displaying separate images with appropriately translated positions to each eye of the user. When using stereopsis techniques, the perceived depth of the 3D visual will depend upon the inter-pupillary distance (IPD) of the user. Rather than calculating an accurate IPD for the user, stereoscopic HMD devices will often be calibrated to an average IPD for a population of users.

In both immersive, virtual reality experiences and augmented reality experiences, differences between a user's actual IPD and the average IPD may result in changes in how the visuals are perceived by the user, as discussed below. When a user is viewing an immersive virtual reality experience, such changes may be less perceptible as compared to an augmented reality experience, because in virtual reality the user has no frame of reference in the real world against which the displayed visuals can be compared. However, even in a virtual reality experience, an incorrect IPD may cause user discomfort. Additionally, if the IPD error is too large, the user may be unable to verge the left and right images displayed to the user's left and right eyes, causing the user to see double, and generally degrading the user's experience of the virtual reality.

The approach of using an average IPD for a user population has several drawbacks in HMD devices that provide augmented reality experiences. These devices comprise at least partially see-through displays that allow superposition of displayed images over a real-world background environment. As the user is seeing the real-world, and not just a virtual representation of the real-world on a display, the real-world background environment provides a ground truth reference frame for the user. A deviation between the user's actual IPD and the IPD used by the HMD device will affect the user's perception of the virtual objects displayed on the HMD device, while the ground truth real-world background environment will remain unchanged. Consequently, such imprecision in IPD may cause the virtual objects to either appear to be an incorrect size or appear to be in an incorrect location compared to the real-world background environment, thereby degrading the user experience.

SUMMARY

To address these issues, a head-mounted display device (HMD device) and method are provided for determining an inter-pupillary distance. The HMD device may comprise an at least partially see-though display, a processor and a non-volatile storage device holding instructions executable by the processor to select an image that corresponds to a physical object viewable by the user; display the image at a perceived offset to the physical object; in response to alignment user input, move a perceived position of the image relative to the physical object; output an instruction to provide completion user input when the image appears to align with the physical object; when the completion user input is received, determine the inter-pupillary distance of the user; and calibrate the head mounted display device based on the inter-pupillary distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows another image generated by the head-mounted display device of FIG. 1 moving different distances in opposite directions according to an embodiment of the present description.

DETAILED DESCRIPTION

The present descriptions relate to determining an inter-pupillary distance (IPD) in a head-mounted display (HMD) device. The HMD may be calibrated based on a determined IPD to provide an augmented reality experience that is customized to a user's specific eye characteristics. In this manner, the HMD may reduce eye strain, provide a consistent quality of operation, and create a more enjoyable augmented reality experience.

The HMD device may render and display holograms and 2D images from the perspective of a view matrix that is a proxy for an eye of the user. If the view matrix for the user's left and the view matrix for the user's right eye accurately reflect the user's eye characteristics, such as IPD, then the hologram or 2D image will be perceived by the user as stable and world-locked in the real-world background environment, and will appear in its intended size and location. However, if the view matrix for one or both eyes does not accurately reflect the user's IPD, then the user will perceive that the image is unstable or moves relative to the background environment, and/or has a different location, orientation, or size than intended by the HMD device.

The present descriptions relate to selecting an image that corresponds to a physical object viewable by the user of the HMD device. The physical object has a physical location relative to the user that may be detected using depth cameras, range finders, or other suitable technology. In some examples, the user may choose a physical object and the corresponding image may be selected by the user when the user captures the image via user input. In other examples, the physical object may be programmatically chosen and the image may be programmatically captured or retrieved. The HMD device may display the image to one eye of the user at a user-perceived offset to the physical object.

Through the process described in more detail below, the user may provide alignment user input until the image appears to be visually aligned with the physical object in the real world. At this point, the user may provide completion user input indicating that the user-perceived location of the image appears to align with the physical object. This process may be repeated for the user's other eye. Using the alignment user input and completion user input, the IPD of the user may be determined. The HMD and associated view matrix for each eye may then be calibrated based on the user's IPD.

Figure 1:
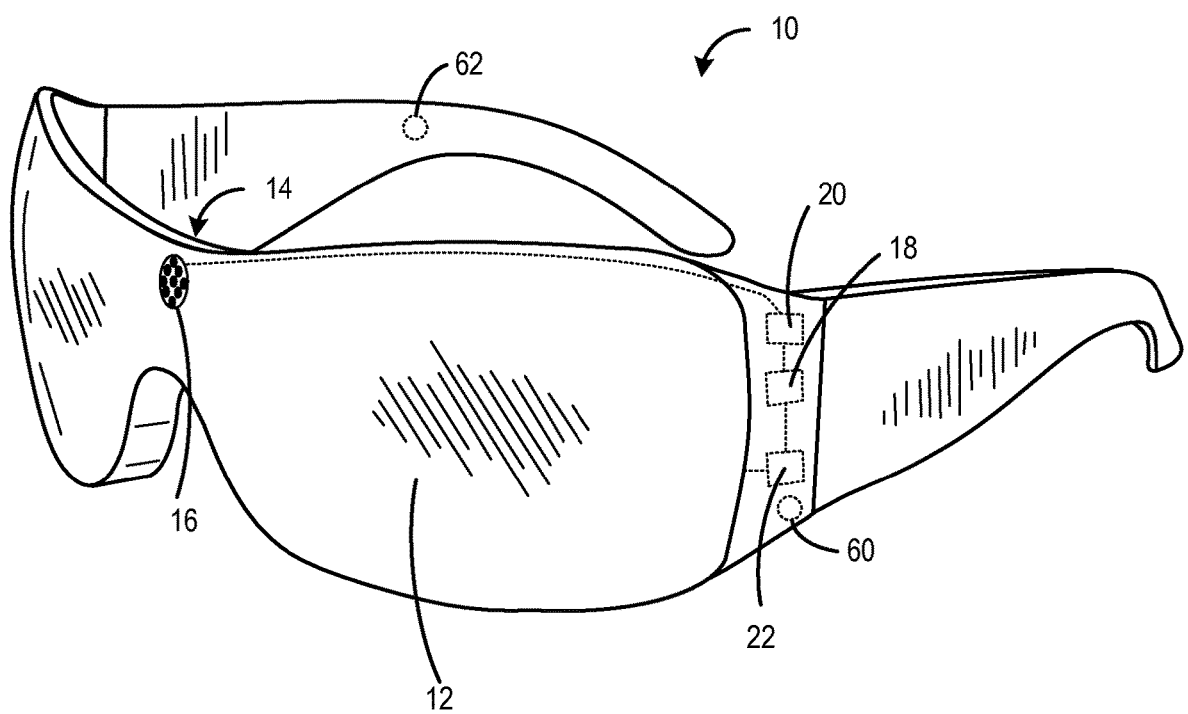
FIG. 1 shows a head-mounted display device according to an embodiment of the present description.

FIG. 1 illustrates an HMD device 10 according to an example of the present disclosure. In this example, the illustrated HMD device 10 takes the form of wearable glasses or goggles, but it will be appreciated that other forms are possible. The HMD device 10 includes an at least partially see-through stereoscopic display 12 that may be configured to visually augment an appearance of a physical environment being viewed by the user through the at least partially see-through stereoscopic display. In some examples, the at least partially see-through stereoscopic display 12 may include one or more regions that are transparent (e.g., optically clear) and may include one or more regions that are opaque or semi-transparent. In other examples, the at least partially see-through stereoscopic display 12 may be transparent (e.g., optically clear) across an entire usable display surface of the stereoscopic display 12.

For example, the HMD device 10 may include an image production system 22 that is configured to display virtual objects to the user with the at least partially see-through stereoscopic display 12. The virtual objects are visually superimposed onto the physical environment so as to be perceived at various depths and locations. The HMD device 10 may use stereoscopy to visually place a virtual object at a desired depth by displaying separate images of the virtual object to both of the user's eyes.

To achieve the perception of depth, the image production system 22 of the HMD device 10 may render the two images of the virtual object at a rendering focal plane of the HMD device 10, such that there is a binocular disparity between the relative positions of the virtual object in the two images. For example, this binocular disparity may be a horizontal disparity where the relative positions of the virtual object in the two images are separated by a distance in the x axis direction. In this embodiment, the x axis may be defined as the axis extending horizontally to the left and the right relative to the user, the y axis extending upward and downward vertically relative to the user, and the z axis extending forward and backward relative to the user, and orthogonally to the x and y axes.

The horizontal disparity between the relative positions of the virtual object in the two images will cause the user to perceive that the virtual object is located at a certain depth within the viewed physical environment due to stereopsis. Using this stereoscopy technique, the HMD device 10 may control the displayed images of the virtual objects, such that the user may perceive that the virtual objects exist at a desired depth and location in the viewed physical environment.

The HMD device 10 includes an optical sensor system 14 that may include one or more optical sensors. In one example, the optical sensor system 14 may include an outward facing optical sensor 16 that may be configured to detect the real-world background from a similar vantage point (e.g., line of sight) as observed by the user through the at least partially see-through stereoscopic display 12. The optical sensor system 14 may include a variety of additional sensors, such as a depth camera and an RGB camera, which may be a high definition camera or have another resolution.

The HMD device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to assess a position and orientation of the vantage point of the at least partially see-through stereoscopic display 12 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 20) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

The HMD device 10 may also include a microphone system that includes one or more microphones, such as microphone 60, that capture audio data. In other examples, audio may be presented to the wearer via one or more speakers, such as speaker 62 on the HMD device 10.

Figure 2:
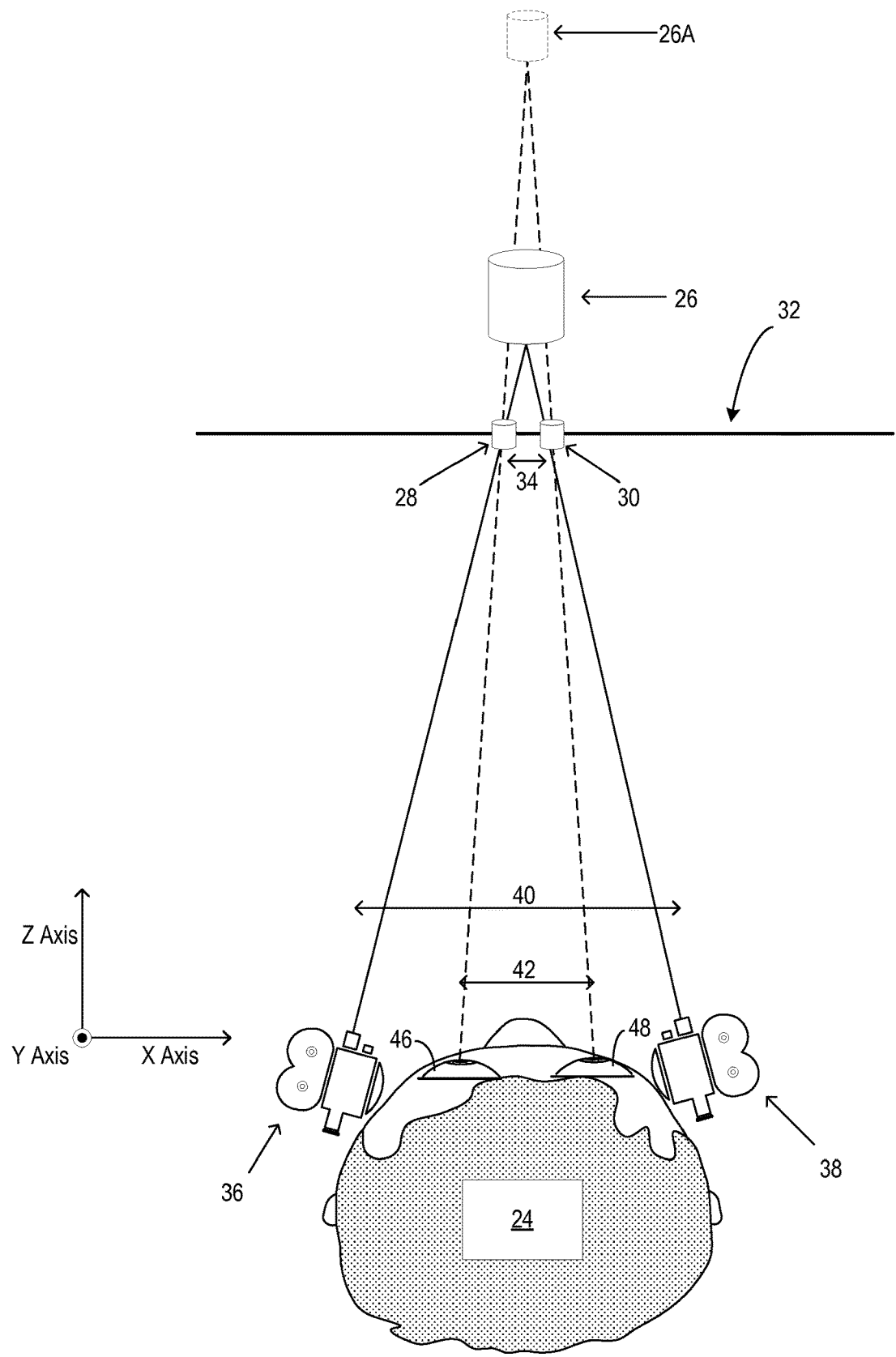
FIG. 2 shows a world-locked virtual object rendered with an incorrect inter-pupillary distance.

With reference now to FIG. 2, in order to display a virtual object 26 at the illustrated depth and location using stereoscopy, the HMD device 10 displays the left image 28 to the left eye 46 of the user 24, and displays the right image 30 to the right eye 48 of the user. The left image 28 and the right image 30 are rendered at the rendering focal plane 32 of the HMD device 10. As illustrated in FIG. 2, the left image 28 and the right image 30 are rendered with a horizontal disparity 34 between their relative positions.

The left image 28 and the right image 30 are rendered by the HMD device 10 from the perspective of a left virtual camera 36 and a right virtual camera 38. It will be appreciated that the left virtual camera 36 and the right virtual camera 38 visually represent view matrices in the software of the HMD device 10. The view matrices are used to project the virtual world of the HMD device 10 onto a specific perspective. That is, the view matrix represented by the left virtual camera 36 is used by the HMD device 10 to model what the left eye 46 of the user 24 would see when looking at the virtual world from the location and orientation of the left virtual camera 36. Similarly, the view matrix represented by the right virtual camera 38 is used by the HMD device 10 to model what the right eye 48 of the user 24 would see when looking at the virtual world from the location and orientation of the right virtual camera 38.

As illustrated in FIG. 2, the relative positions of the left virtual camera 36 and the right virtual camera 38 are separated by a distance 40 from each other in the x axis. This distance 40 may represent an initial preset IPD of the HMD device 10. However, it will be appreciated that in some examples the initial preset IPD represented by the distance 40 may be different than the user's actual IPD 42 as shown in FIG. 2. Consequently and in these examples, when viewing the left image 28 and the right image 30, the user will not actually perceive that the virtual object 26 is located at its desired depth. Instead, the user will perceive that the virtual object 26 exists at the depth and location illustrated by the perceived virtual object 26A, which corresponds to the user's actual IPD.

Figure 3:
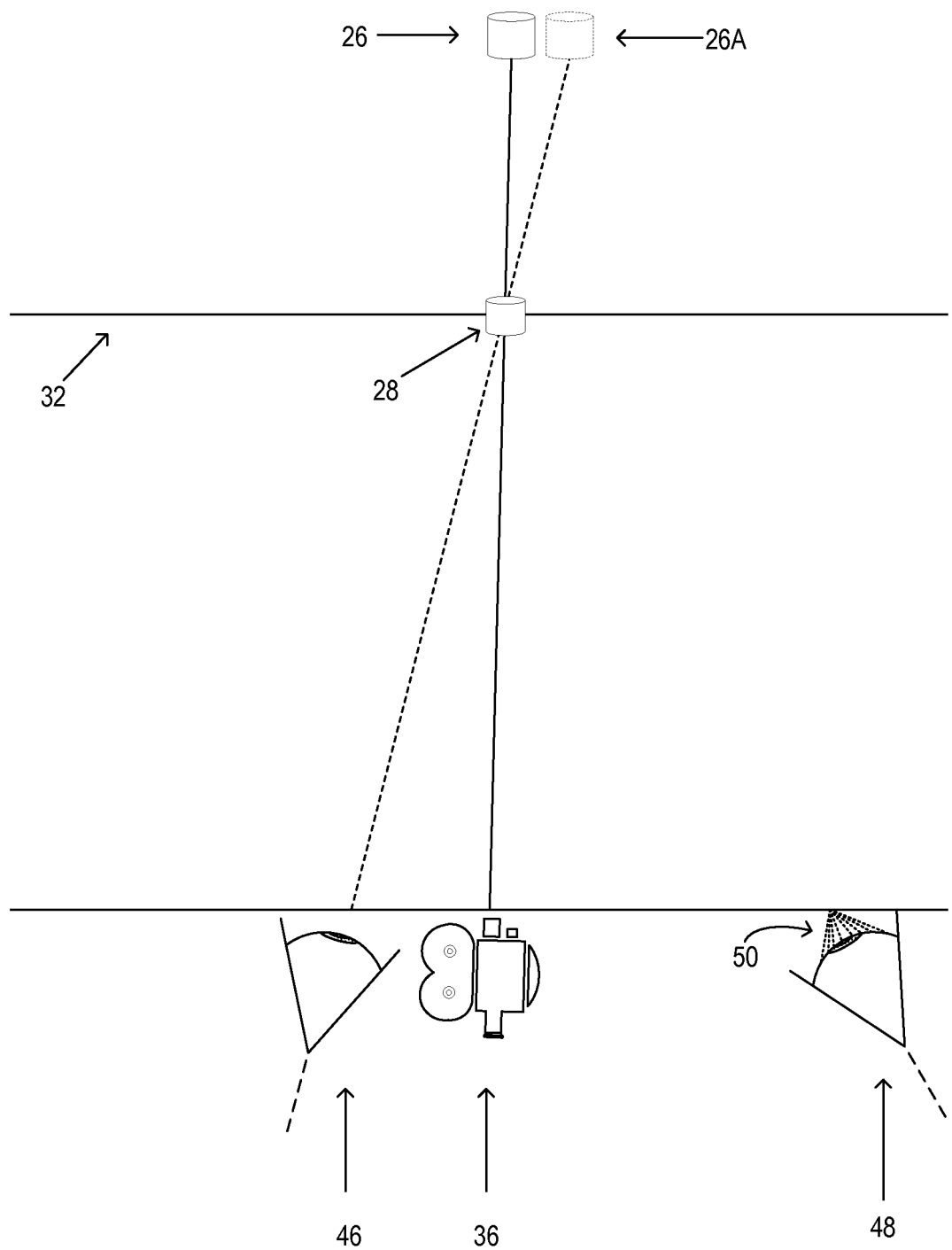
FIG. 3 shows a world-locked virtual object rendered for a single eye with an incorrect inter-pupillary distance.

Now turning to FIG. 3, an example of IPD error on perception from a single eye are illustrated. In this example, a view of the virtual object 26 from the perspective of the left virtual camera 36 results in the left image 28 being rendered at the rendering focal plane 32 of the HMD device 10. In this example, the HMD device 10 does not render in the user's right eye 48 a view of the virtual object 26 from the perspective of a right virtual camera. Because people have one eye that is more dominant than the other, if the user's right eye 48 is left unobstructed, it may impair the ability of the left eye 46 to perceive the actual location of an image relative to a corresponding physical object in the real-world environment. Instead and in some examples, the HMD device 10 may display blocking light 50 to the user's right eye 48 to obscure the user's vision of the real-world environment in that eye. In this manner, the user may more easily and comfortably view the left image 28 and surrounding real-world environment with the user's left eye 46. In this manner and as discussed in more detail below, the user's ability to determine when the left image 28 appears to align with a corresponding physical object in the real-world environment may be enhanced.

As illustrated in FIG. 3, when viewing the left image 28 with the user's left eye 46, the user will not perceive that virtual object 26 exists at the location and depth intended by the HMD device 10. In this example, due to the user's IPD being larger than the default IPD, the user's left eye 46 is shifted to the left relative to the left virtual camera 36. Consequently, when viewing the left image 28 displayed on the at least partially see-through display 12 at the rendering focal plane 32, the user will perceive the perceived virtual object 26A, which is shifted to the right of the intended location of the virtual object 26.

It will be appreciated that the human eye is acutely sensitive to alignment errors. Even small discrepancies between an initial preset default IPD of the HMD device 10 and the user's actual IPD will cause the user to perceive that the virtual objects rendered by the HMD device are in incorrect locations and/or depths relative to the HMD device's virtual world. As illustrated in FIG. 2 and FIG. 3, this error occurs in both two eye systems and one eye systems. This error may be particularly noticeable to the user in augmented reality environments in which the real world provides a ground truth reference frame, and incorrect locations of a virtual object may appear obvious, which generally degrades the user experience.

As described in more detail below, while the example of FIG. 3 displays an image of the virtual object to the user's left eye 46 and blocking light 50 to the user's right eye 48, in other examples an image may be displayed to the user's right eye and blocking light displayed to the user's left eye.

Figure 4:
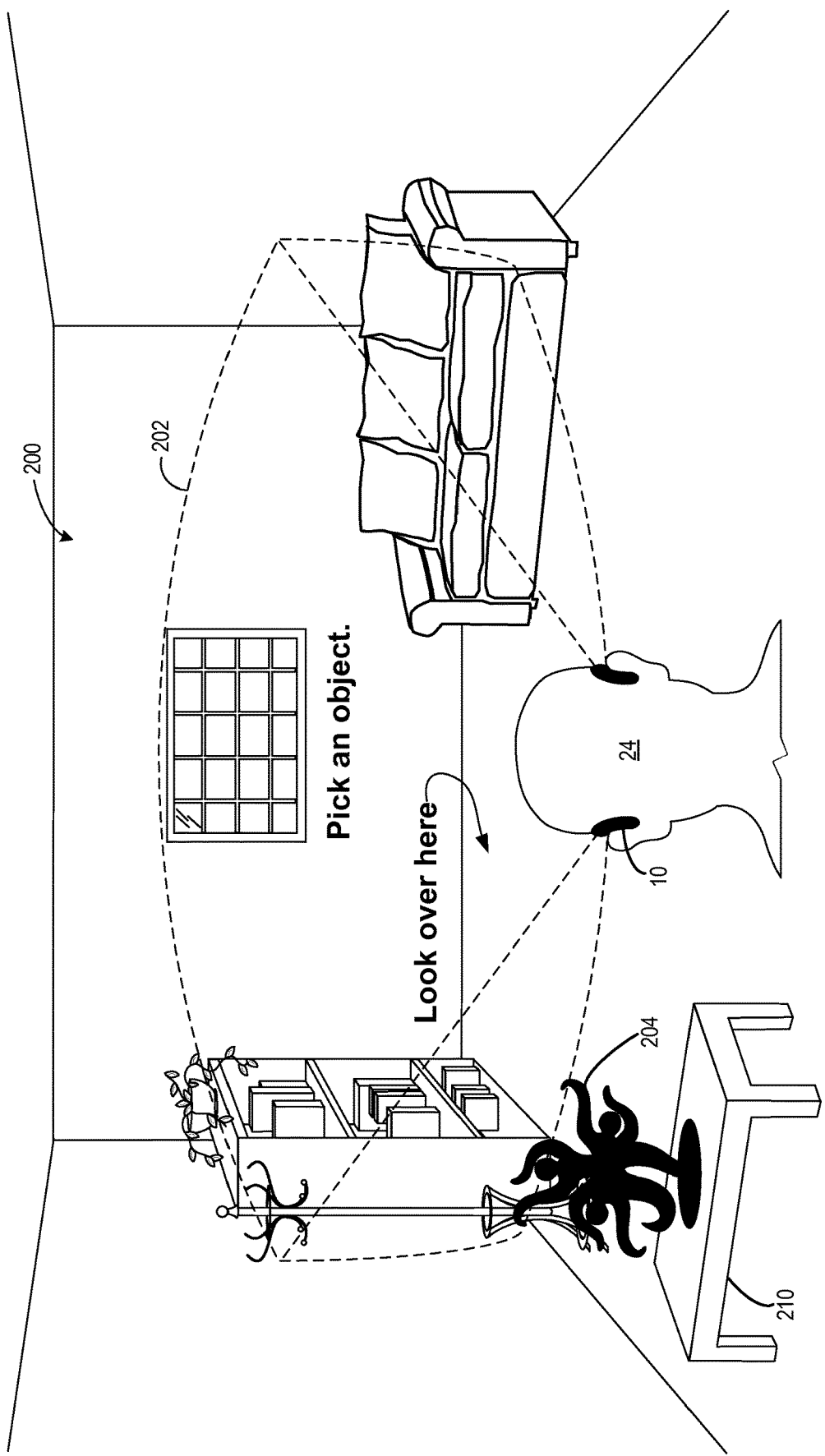
FIG. 4 shows a user wearing the head-mounted display device of FIG. 1 in a room according to an embodiment of the present description.

With reference now to FIG. 4, descriptions of example use cases of the present disclosure will now be provided. FIG. 4 schematically illustrates a user 24 wearing an HMD device 10 in a living room 200. A field-of-view 202 of the HMD device 10 corresponding to a current position and orientation of the HMD device is indicated. In some examples, the user 24 may be instructed via the HMD device 10 to choose an object in the room 200. In the example of FIG. 4, the HMD device 10 may display holographic text reading "Pick an object." In addition to or instead of instructing the user 24 via displayed text, the HMD device 10 may provide audio instructions. In the example of FIG. 4, the user 24 may be instructed by an audio voice over to "Pick an object that's about an arm's length away, and face it straight on."

It will be appreciated that the instruction to choose an object in the room 200 may comprise any suitable content and format. For example, the user 24 may be instructed to find an object that is preferably planar and stationary, and that has a high visual contrast. Examples of such objects may include a book, magazine, picture frame, mobile phone, etc. In some examples, the instructions may suggest suitable objects via voice, displayed text, and/or displayed images of such objects.

In some examples, the HMD device 10 may continuously detect and/or capture images of physical objects and other physical features of the real world environment in which it is located. For example, such objects and features may be detected by the outward facing optical sensor 16 and depth camera of the optical sensor system 14 of the HMD device 10. Characteristics of the physical objects and features, such as height and width, may be determined based on images captured by optical sensor system 14.

In some examples, such images may be analyzed to determine one or more physical objects that would be suitable for determining an IPD of the user, as described in more detail below. In other words, the HMD device 10 may programmatically detect one or more physical objects. In some examples, the HMD device 10 may then provide guidance that guides the user 24 to an area in which such objects are located and/or to the object itself. In the example of FIG. 4, the HMD device 10 may have located a generally planar art piece 204 located on table 210 in the room 200. The HMD device 10 may provide visual guidance to the user 24 by displaying text such as, for example, "Look over here" with an arrow pointing towards the art piece 204. In some examples such guidance may take the form of audio guidance.

Figure 5:
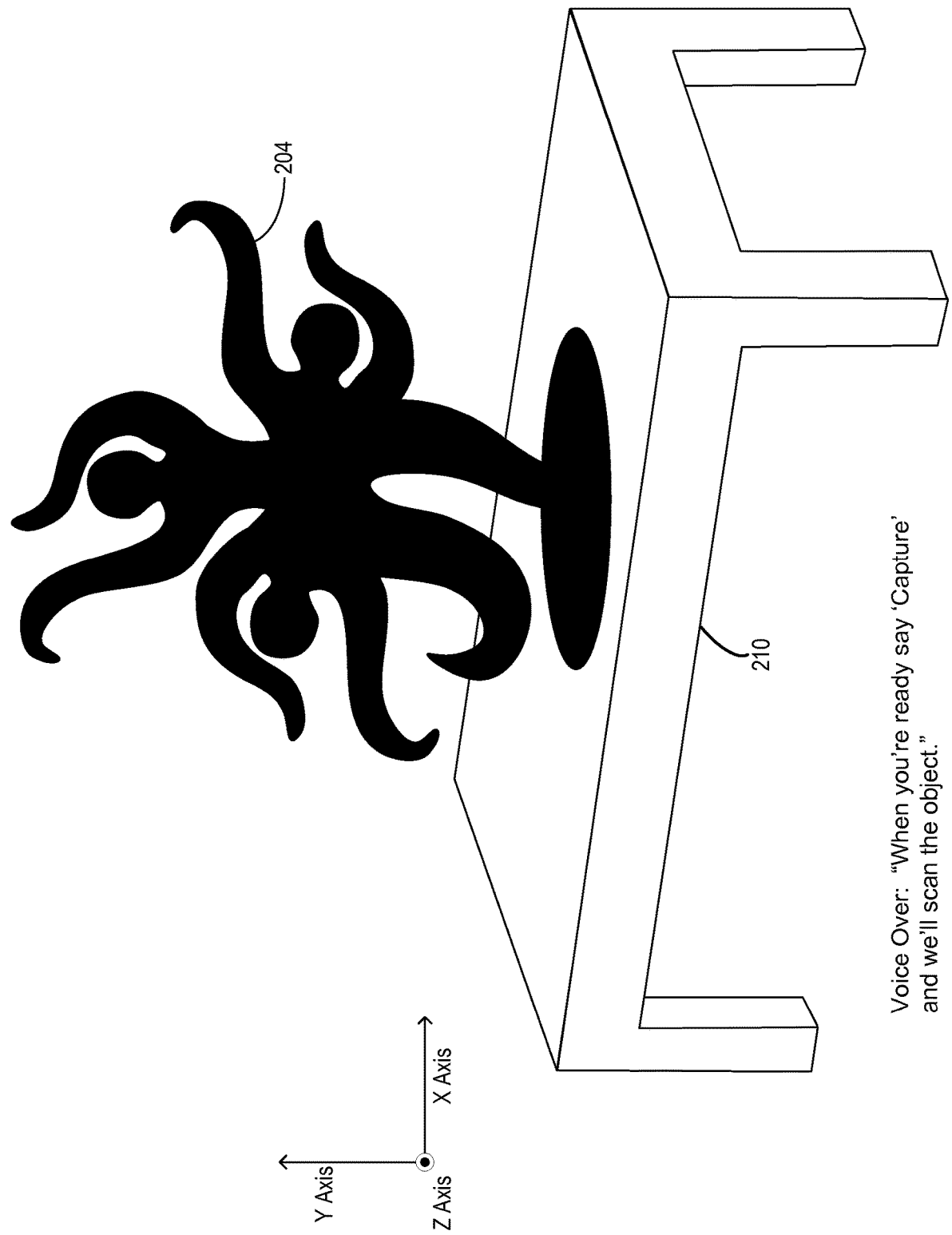
FIG. 5 shows an example physical object as viewed by the user according to an embodiment of the present disclosure.

The user 24 may turn to the left and move closer to the art piece 204 and table 210. FIG. 5 shows the user's view through the HMD device 10 of the art piece 204 and table 210. In some examples, the user may select an image of the art piece 204 by causing the HMD device 10 to capture an image of the art piece. In some examples, the HMD device 10 may instruct the user 24 to capture an image of a physical object. For example, in FIG. 5 the HMD device 10 may provide audio instructions for the user to capture an image, such as, "When you're ready say 'Capture' and we'll scan the object."

In some examples, enabling a user to choose the physical object that will be imaged and used to determine the user's IPD may enable the HMD device 10 to avoid continuously scanning the real world environment for candidate objects. In this manner, the HMD device 10 may conserve power and resources by selectively capturing images of objects selected by the user.

With reference again to FIG. 5, the user 24 may control the HMD device 10 to capture one or more images of the art piece 204. In some examples, utilizing voice recognition capabilities of the HMD device 10, the user may give user input in the form of a voice command, such as "Capture", that causes the HMD device 10 to capture one or more images of the art piece 204. In some examples, image analysis may be performed on the captured image(s) and other sensor data, such as depth information received from a depth camera of the optical sensor system 14. From the image analysis, visual characteristics such as the height, width, shape, etc., of the art piece 204 may be calculated. Using these characteristics, an image corresponding to the art piece 204 may be generated. In some examples, the image may be a hologram.

In some examples, the HMD device 10 may continuously image or re-scan a selected physical object, and may continuously render the corresponding image based on such re-scanning during the alignment process (with the current view matrix). In this manner, any potential movement of the physical object during the alignment process may be offset. In some examples, such continuous re-scanning and rendering may enable the user to select for the alignment process a hand held object that is intrinsically non-stationary. In some examples, this may allow for the physical movement of the object to be used as a method of user input to the alignment process, as opposed to moving the corresponding image as described in more detail below.

In other examples, and using the visual characteristics of the physical object, an image of the object may be selected by retrieving the image from a storage. In other words, the physical object may be pre-known to the HMD device 10, such that characteristics and physical features of the object are stored in a non-volatile storage device of the HMD device 10. A corresponding image of the object may be programmatically generated for display or pre-stored on a non-volatile storage device and retrieved for display. Thus, for example, an image comprising a virtual copy of the art piece 204 may be stored on the HMD device 10.

In some examples and as noted above, the HMD device 10 may programmatically detect and/or capture images of physical objects and other physical features of the real world environment in which it is located. Using this data, the HMD device 10 may programmatically identify a physical object that is suitable for determining the IPD of a user. As described in more detail below, the HMD device 10 may then generate and utilize an image corresponding to the identified physical object to determine the IPD of a user.

Figure 6:
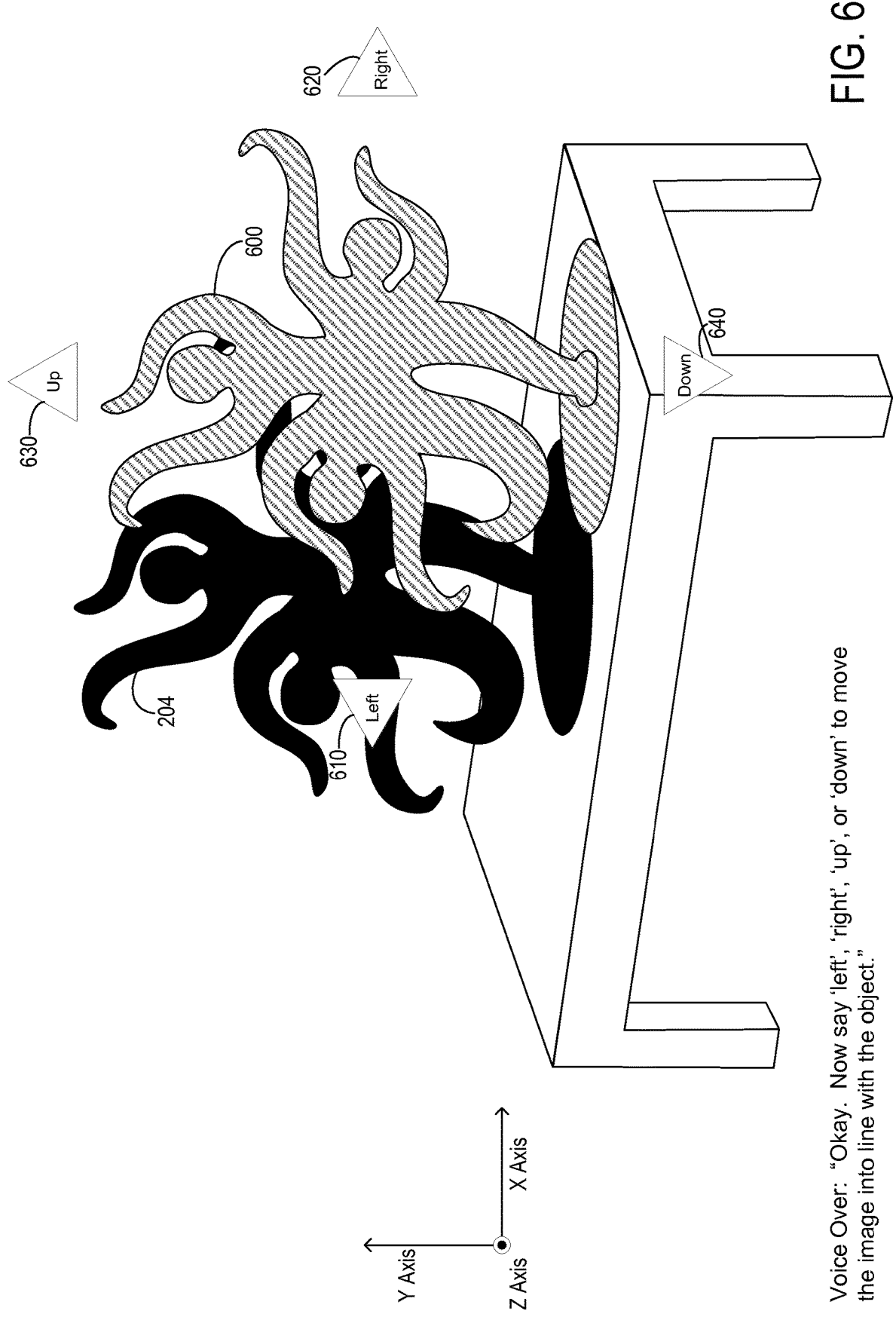
FIG. 6 shows an image generated by the head-mounted display device of FIG. 1 and corresponding to the physical object according to an embodiment of the present description.

With reference now to FIG. 6, the HMD device 10 may display an image 600 of the art piece 204 in a manner in which the user 24 perceives the image 600 to be offset from the art piece 204. In some examples image 600 may be a virtual copy of the art piece 204. In other examples, the image may not necessarily be a virtual copy, but may take the form of an entire or partial outline of the art piece 204, an edge of the art piece, a shape that is complimentary to a portion of the art piece, etc. The image 600 may comprise a 2D image or a hologram.

In some examples, the view of the image 600 may be displayed to a first eye of the user via the at least partially see-through stereoscopic display 12 of the HMD device 10. The view of the image 600 may be rendered and displayed based on characteristics of a default view matrix, such as the view matrix's location and orientation in the virtual world. Consequently, because the characteristics of the default view matrix may deviate from the actual characteristics of the user's eye, such as IPD, the user may perceive that the image 600 is located in an incorrect position or depth relative to the real world environment. As a result, the user may perceive that the image 600 is not actually aligned with the art piece 204.

As noted above, in different examples the physical object to which the image corresponds may take many kinds of different forms. For example, the physical object may be a generally two dimensional (2D) object, such as a poster, magazine, or other planar surface. In some examples the physical object may be a three dimensional (3D) object, such as a mobile phone, coffee cup, etc. In some examples, the 3D object may have at least one substantially planar surface. Accordingly, the image corresponding to an object may also be 2D or 3D.

In some examples, the HMD device 10 may instruct the user 24 to provide alignment user input to align the image 600 with the art piece 204. In the example of FIG. 6, the HMD device 10 may provide audio instructions for the user to align the image 600 with the art piece 204, such as, "Okay. Now say 'left', 'right', 'up', or 'down' to move the image into line with the object." In some examples, and in response to receiving verbal instructions to move the image 600 in a particular direction, the HMD device 10 may use voice recognition capabilities to move the user-perceived location of the image 600 in a corresponding direction.

Figure 7:
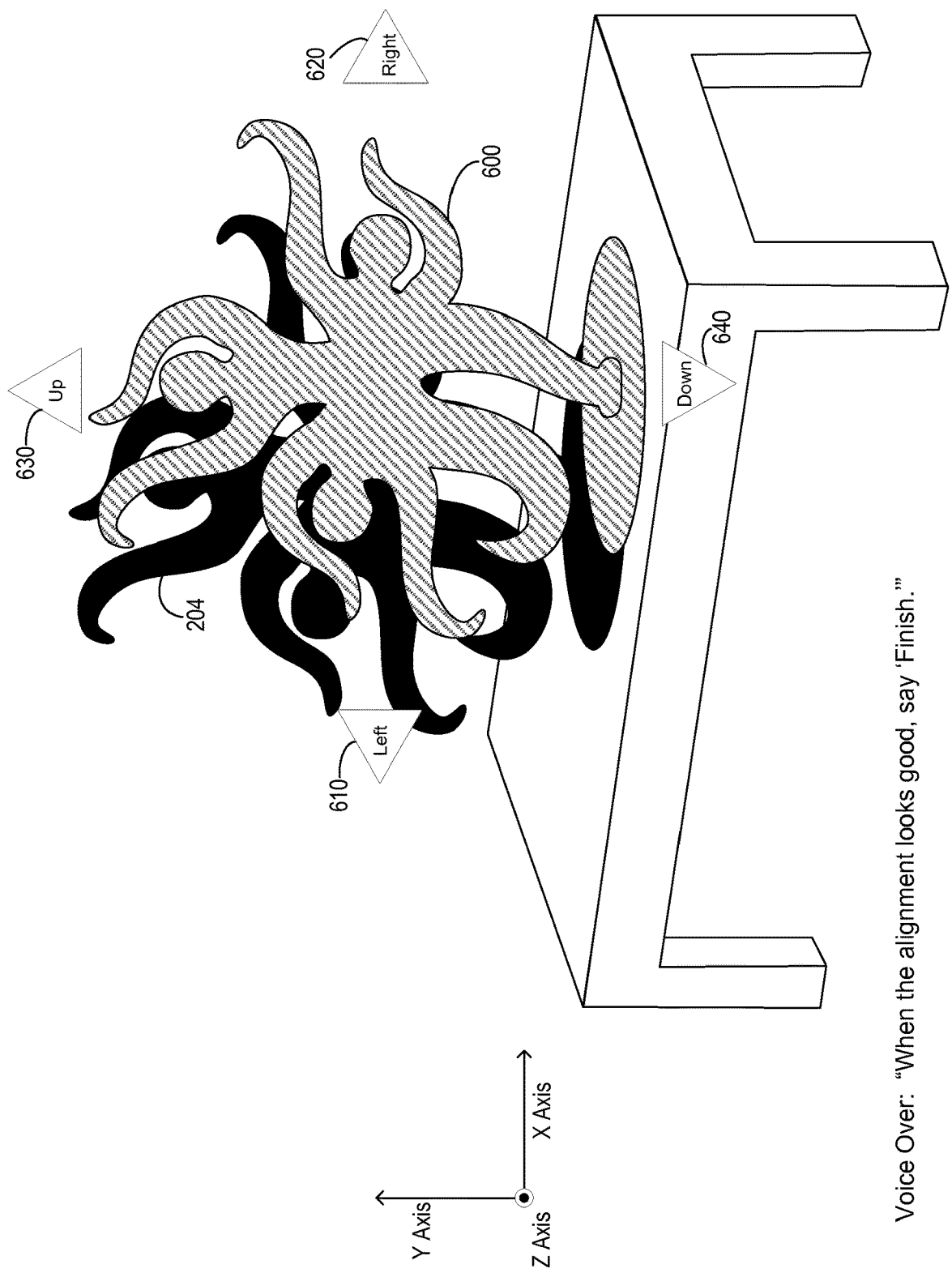
FIG. 7 shows the image of FIG. 6 moving closer to aligning with the physical object according to an embodiment of the present description.

In some examples, the HMD device 10 may display one or more alignment icons or other user interface elements through which the user 24 may manipulate the perceived location of the image 600. In the example of FIG. 6, four icons denoting movement directions "Left" 610, "Right" 620, "Up" 630, and "Down" 640 may be displayed around the image 600. The user 24 may then select an alignment icon to move the perceived location of the image 600 in the corresponding direction. For example and with reference to FIG. 7, the user 24 may select the Left icon 610 and Up icon 630 to move the perceived location of the image 600 closer to alignment with the art piece 204.

It will be appreciated that while from the user's perspective the image 600 will appear to be moving relative to the art piece 204 as the alignment user inputs are entered, in fact the image may be world-locked in the virtual world of the HMD device 10. Rather than the image moving, the alignment user input may change one or more characteristics of the default view matrix, such as orientation and location. By changing the orientation and location of the default view matrix, the view of the image 600 being displayed to the user will also change, and the user will perceive a corresponding change in the location of the image.

In some examples, the user may select an alignment icon via a physical gesture performed by the user and detected by a depth camera of the HMD device 10. In some examples, such gesture may comprise the user 24 moving one or more fingers, or the user's entire hand, in a direction that corresponds with the Left 610, Right 620, Up 630 or Down 640 icon. The HMD device 10 may detect such movement of the user's finger(s)/hand, and may move the perceived location of the image 600 in the corresponding direction.

In some examples, the icons may be displayed to appear within reach of the user 24. In these examples, the user 24 may "tap" an icon image with a finger to move the perceived location of the image 600 in a corresponding direction. It will be appreciated that numerous other examples of user gestures that may select an icon are possible.

In some examples, the user 24 may provide gaze input to select one of the alignment icons. For example, where the HMD device 10 includes a gaze tracking system, the user 24 may gaze at one of the alignment icons to move the image 600 in a corresponding direction. The HMD device 10 may detect the user's gaze at the icon, and may move the image 600 in a corresponding direction.

In some examples, a head tracking system of the HMD device 10 may be utilized as an input mechanism to enable the user 24 to adjust the position of the image 600. For example, the user 24 may move his or her head to the right, left, up or down to move the image 600 in a corresponding direction.

In some examples the HMD device 10 may move the perceived location of an image by different amounts in response to alignment user input that corresponds to different directions. In one example and with reference to FIG. 8, the HMD device 10 may display an image 800 that corresponds to a physical object 810. In this example, the image 800 is displayed initially at a perceived location 820 that is left of the actual location of the physical object 810.

The HMD device 10 may receive initial alignment user input from the user 24 that corresponds to moving the perceived position of the image 800 to the right. In response, the HMD device 10 may move the perceived position of the image 800 by an initial distance A to the right along the X axis. After such movement, the user may perceive the image to be located at first updated position 830. In some examples, the user 24 may follow this initial alignment user input with one or more additional alignment user inputs that move the perceived position of the image 800 to the right. Each of these additional alignment user inputs may move the perceived position of the image 800 by the same distance A to the right.

Subsequently, the HMD device 10 may receive subsequent alignment user input that corresponds to moving the perceived position of the image 800 in the opposite direction, or to the left along the X axis. In response, the HMD device 10 may move the perceived position of the image 800 to the left by a subsequent distance B that is less than the initial distance A. After such movement, the user may perceive the image to be located at a second updated position 840. In some examples, the user 24 may follow this subsequent alignment user input with one or more additional subsequent alignment user inputs that move the perceived position of the image 800 to the left. Each of these additional subsequent alignment user inputs may move the perceived position of the image 800 by the same distance B to the left. It will be appreciated that the initial distance A and shorter, subsequent distance B may be any suitable lengths. It will also be appreciated that in other examples alignment user input may correspond to moving the perceived position of the image 800 in the Y axis or the Z axis.

In this manner, the HMD device 10 may provide an efficient method for the user 24 to fine-tune the perceived position of the image 800. For example, as the user 24 will initially move the perceived position of the image 800 in a first direction toward the physical object 810, the user 24 may move the position of the image until a movement locates the image past the physical object in the first direction. As this offset of the image 800 from the physical object 810 may be less than the initial offset existing prior to the user's initial movement of the image 800, when the user provides subsequent alignment user input in the opposite direction, the distance of movement needed to correct this offset may be smaller. Accordingly, by providing movement by subsequent distance B that is less than the initial distance A, the user may efficiently fine-tune the perceived position of the image 800 by moving the image in this opposite direction by the smaller, subsequent distance B.

In some examples, each time the user provides alignment user input in a direction opposite to the direction of the preceding alignment user input, the distance of movement of the image 800 may be less than the distance of movement corresponding to the preceding alignment user input.

In some examples, the alignment user input may further include input to rotate the image 600 in one or more of a pitch, yaw, or roll rotation. Similarly to translating along the X, Y and Z axes, the image 600 may be world-locked in the virtual world of the HMD device 10, even though the image may appear to be rotating to the user. In this example, an alignment user input to rotate the image 600 in a pitch, yaw, or roll rotation may actually change a pitch, yaw, and roll characteristic of the default view matrix. The rotation to the default view matrix will have a corresponding effect on the view of the image 600 displayed to the user, and the user will perceive this effect on the view of the image as the image itself rotating.

With reference again to FIG. 7, in some examples the HMD device 10 may instruct the user 24 to provide completion user input when the image 600 appears to align with the art piece 204. For example, in the example of FIG. 7 the HMD device 10 may provide audio instructions to the user such as, "When the alignment looks good, say 'Finish'."

Figure 9:
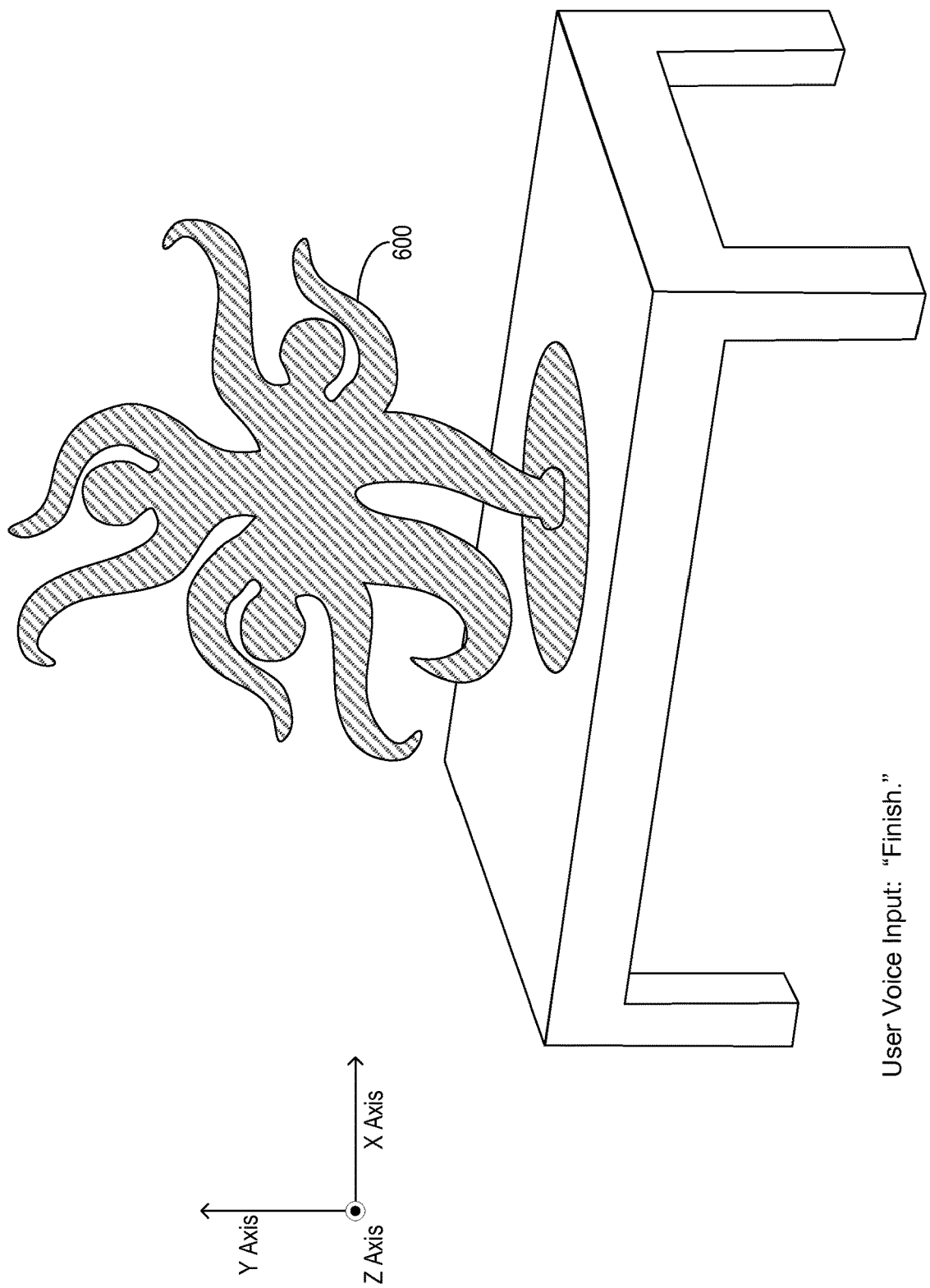
FIG. 9 shows the image of FIG. 6 aligned with the physical object according to an embodiment of the present description.

With reference now to FIG. 9, the HMD device 10 may receive completion user input from the user 24 when the user perceives the image 600 to be aligned with the art piece 204. In this example, the completion user input may comprise the user 24 speaking the word "Finish." The HMD device 10 may use voice recognition technology to recognize and interpret this input. In some examples, when the HMD device 10 receives the completion user input, the one or more instances of alignment user input that were received from the user 24 may be stored and subsequently used to determine the IPD of the user.

The above-described process may be repeated for the user's other eye, such that one or more instances of alignment user input are received from the user 24 relative to the user's other eye. Using the alignment user input received for both of the user's eyes, the user's IPD may be determined. The HMD then may be calibrated based on the user's IPD. For example, the view matrix associated with each eye of the user may be calibrated using the determined IPD of the user.

Figure 10A:
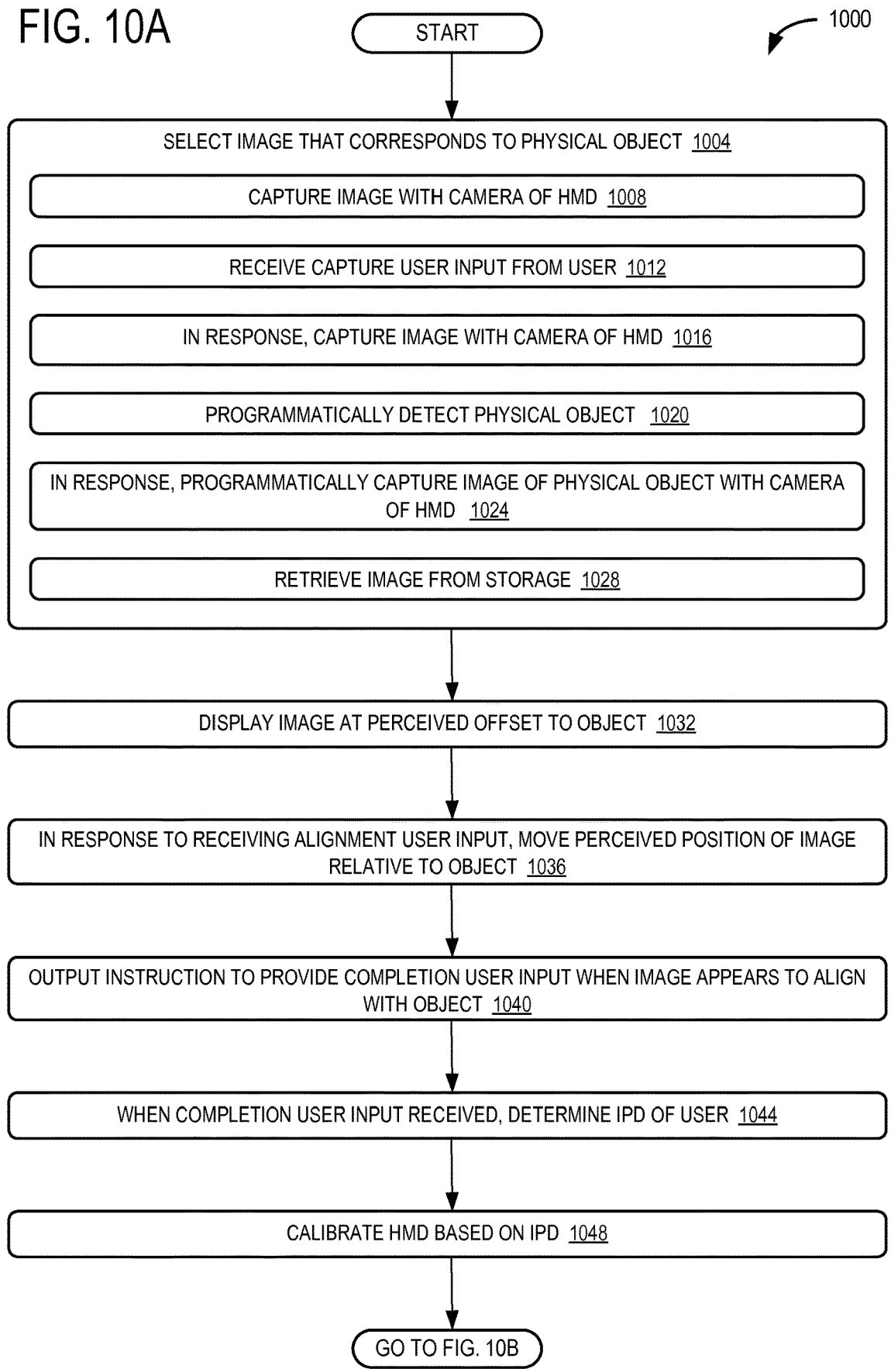
FIGS. 10A and 10B show a method of determining inter-pupillary distance according to an embodiment of the present description.
Figure 10B:
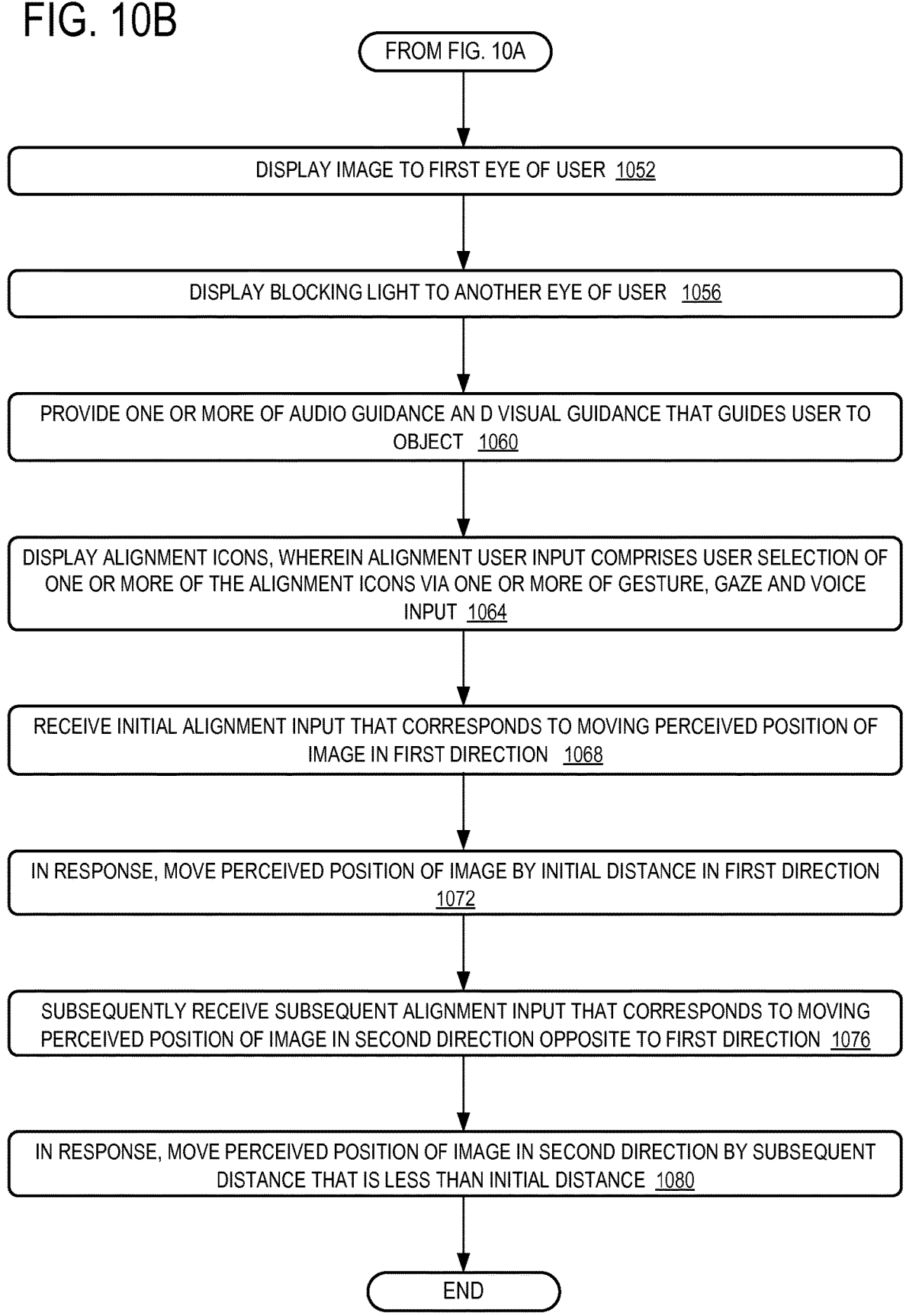

FIGS. 10A and 10B illustrate a flow chart of a method 1000 for determining an IPD of a user of an HMD device according to an example of the present disclosure. The following description of method 1000 is provided with reference to the software and hardware components of the HMD device 10 described above and shown in FIGS. 1-9. It will be appreciated that method 1000 also may be performed in other contexts using other suitable hardware and software components.

With reference to FIG. 10A, at 1004 the method 1000 may include selecting an image that corresponds to a physical object viewable by the user. At 1008 the method 1000 may include capturing the image with a camera of the HMD device. At 1012 the method 1000 may include receiving capture user input from the user. At 1016 the method 1000 may include, in response to receiving the capture user input, capturing the image with the camera of the HMD device. At 1020 the method 1000 may include programmatically detecting the physical object. At 1024 the method 1000 may include, in response to programmatically detecting the physical object, programmatically capturing the image of the physical object with the camera. At 1028 the method 1000 may include retrieving the image from a storage.

At 1032 the method 1000 may include displaying the image at a perceived offset to the physical object. At 1036 the method 1000 may include, in response to receiving alignment user input, moving a perceived position of the image relative to the physical object. At 1040 the method 1000 may include outputting an instruction to provide completion user input when the image appears to align with the physical object. At 1044 the method 1000 may include, when the completion user input is received, determining the IPD of the user. At 1048 the method 1000 may include calibrating the HMD device based on the inter-pupillary distance.

With reference now to FIG. 10B, at 1052 the method 1000 may include displaying the image to a first eye of the user. At 1056 the method 1000 may include displaying blocking light to the other eye of the user to obscure vision in the other eye. At 1060 the method 1000 may include providing one or more of audio guidance and visual guidance that guides the user to the physical object. At 1064 the method 1000 may include displaying a plurality of alignment icons, and wherein the alignment user input comprises user selection of one or more of the alignment icons via one or more of gesture input, gaze input and voice input.

At 1068 the method 1000 may include receiving initial alignment input that corresponds to moving the perceived position of the image in a first direction. At 1072 the method 1000 may include, in response to receiving initial alignment input, moving the perceived position of the image by an initial distance in the first direction. At 1076 the method 1000 may include subsequently receiving subsequent alignment input that corresponds to moving the perceived position of the image in a second direction opposite to the first direction. At 1080 the method 1000 may include in response, moving a perceived position of the image in the second direction by a subsequent distance that is less than the initial distance.

It will be appreciated that method 1000 is provided by way of example and is not meant to be limiting. Therefore, it is to be understood that method 1000 may include additional and/or alternative steps relative to those illustrated in FIGS. 10A and 10B. Further, it is to be understood that method 1000 may be performed in any suitable order. Further still, it is to be understood that one or more steps may be omitted from method 1000 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
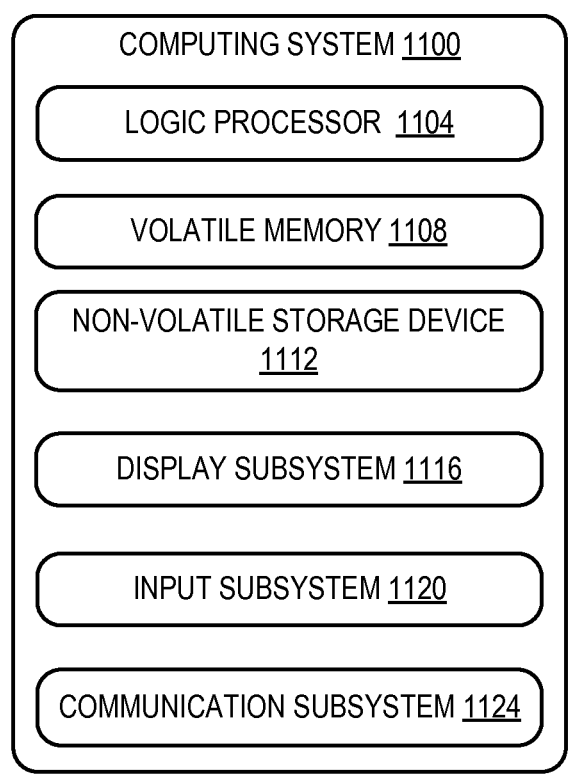
FIG. 11 shows a computing system according to an embodiment of the present description.

FIG. 11 schematically shows a non-limiting embodiment of a computing system 1100 that can enact one or more of the methods and processes described above. Computing system 1100 is shown in simplified form. Computing system 1100 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 1100 includes a logic processor 1104, volatile memory 1108, and a non-volatile storage device 1112. Computing system 1100 may optionally include a display subsystem 1116, input subsystem 1120, communication subsystem 1124, and/or other components not shown in FIG. 11.

Logic processor 1104 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1104 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 1108 may include physical devices that include random access memory. Volatile memory 1108 is typically utilized by logic processor 1104 to temporarily store information during processing of software instructions. It will be appreciated that volatile memory 1108 typically does not continue to store instructions when power is cut to the volatile memory 1108.

Non-volatile storage device 1112 includes one or more physical devices configured to hold instructions executable by the logic processors to implement the methods and processes described herein. When such methods and processes are implemented, the state of non-volatile storage device 1112 may be transformed—e.g., to hold different data.

Non-volatile storage device 1112 may include physical devices that are removable and/or built-in. Non-volatile storage device 1112 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1112 may include nonvolatile, dynamic, static, read/write, read-only, sequential-access, location-addressable, file-addressable, and/or content-addressable devices. It will be appreciated that non-volatile storage device 1112 is configured to hold instructions even when power is cut to the non-volatile storage device 1112.

Aspects of logic processor 1104, volatile memory 1108, and non-volatile storage device 1112 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1100 implemented to perform a particular function. In some cases, a program may be instantiated via logic processor 1104 executing instructions held by non-volatile storage device 1112, using portions of volatile memory 1108. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 1116 may be used to present a visual representation of data held by non-volatile storage device 1112. This visual representation may take the form of a graphical user interface (GUI). As the herein described methods and processes change the data held by the non-volatile storage device, and thus transform the state of the non-volatile storage device, the state of display subsystem 1116 may likewise be transformed to visually represent changes in the underlying data. Display subsystem 1116 may include one or more display devices utilizing virtually any type of technology. Such display devices may be combined with logic processor 1104, volatile memory 1108, and/or non-volatile storage device 1112 in a shared enclosure, or such display devices may be peripheral display devices. The at least partially see-through display of HMD 10 described above is one example of a display subsystem 1116.

When included, input subsystem 1120 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; any of the sensors described above with respect to position sensor system 18 of FIG. 1; and/or any other suitable sensor.

When included, communication subsystem 1124 may be configured to communicatively couple computing system 1100 with one or more other computing devices. Communication subsystem 1124 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following paragraphs provide additional support for the claims of the subject application. One aspect provides a head-mounted display device for determining an inter-pupillary distance of a user comprising, an at least partially see-through display, a processor, and a non-volatile storage device holding instructions executable by the processor to: select an image that corresponds to a physical object viewable by the user; display the image at a perceived offset to the physical object; in response to alignment user input, move a perceived position of the image relative to the physical object; output an instruction to provide completion user input when the image appears to align with the physical object; when the completion user input is received, determine the inter-pupillary distance of the user; and calibrate the head mounted display device based on the inter-pupillary distance. The head-mounted display device may additionally or optionally include, wherein the instructions are executable by the processor to select the image by capturing the image with a camera of the head-mounted display device. The head-mounted display device may additionally or optionally include, wherein the instructions are executable by the processor to capture the image in response to receiving capture user input. The head-mounted display device may additionally or optionally include, wherein the instructions are executable by the processor to capture the image by: programmatically detecting the physical object; and in response, programmatically capturing the image of the physical object. The head-mounted display device may additionally or optionally include, wherein the instructions are executable by the processor to select the image by retrieving the image from a storage. The head-mounted display device may additionally or optionally include, wherein the instructions are executable by the processor to: display the image to a first eye of the user; and display blocking light to another eye of the user to obscure vision in the other eye. The head-mounted display device may additionally or optionally include, wherein the instructions are executable by the processor to provide one or more of audio guidance and visual guidance that guides the user to the physical object. The head-mounted display device may additionally or optionally include, wherein the instructions are executable by the processor to display a plurality of alignment icons, and wherein the alignment user input comprises user selection of one or more of the alignment icons via one or more of gesture input, gaze input and voice input. The head-mounted display device may additionally or optionally include, wherein the instructions are executable by the processor to: receive initial alignment user input that corresponds to moving the perceived position of the image in a first direction; in response, move the perceived position of the image by an initial distance in the first direction;

subsequently receive subsequent alignment user input that corresponds to moving the perceived position of the image in a second direction opposite to the first direction; and in response, move the perceived position of the image in the second direction by a subsequent distance that is less than the initial distance.

Another aspect provides a method for determining an inter-pupillary distance of a user of a head-mounted display device comprising: selecting an image that corresponds to a physical object viewable by the user; displaying the image at a perceived offset to the physical object; in response to receiving alignment user input, moving a perceived position of the image relative to the physical object; outputting an instruction to provide completion user input when the image appears to align with the physical object; when the completion user input is received, determining the inter-pupillary distance of the user; and calibrating the head mounted display device based on the inter-pupillary distance. The method may additionally or optionally include, capturing the image with a camera of the head-mounted display device. The method may additionally or optionally include, receiving capture user input from the user; and in response, capturing the image with the camera. The method may additionally or optionally include, programmatically detecting the physical object; and in response, programmatically capturing the image of the physical object with the camera. The method may additionally or optionally include, selecting the image comprises retrieving the image from a storage. The method may additionally or optionally include, displaying the image to a first eye of the user; and displaying blocking light to another eye of the user to obscure vision in the other eye. The method may additionally or optionally include, providing one or more of audio guidance and visual guidance that guides the user to the physical object. The method may additionally or optionally include, displaying a plurality of alignment icons, and wherein the alignment user input comprises user selection of one or more of the alignment icons via one or more of gesture input, gaze input and voice input. The method may additionally or optionally include, receiving initial alignment user input that corresponds to moving the perceived position of the image in a first direction; in response, moving the perceived position of the image by an initial distance in the first direction; subsequently receiving subsequent alignment user input that corresponds to moving the perceived position of the image in a second direction opposite to the first direction; and in response, moving the a perceived position of the image in the second direction by a subsequent distance that is less than the initial distance. Another aspect provides a head mounted display device for determining an inter-pupillary distance of a user, comprising: an at least partially see-through display; a processor; and a non-volatile storage device holding instructions executable by the processor to: programmatically detect a physical object; in response, programmatically capture an image of the physical object with a camera of the head-mounted display device; display the image at a perceived offset to the physical object; in response to alignment user input, move a perceived position of the image relative to the physical object; output an instruction to provide completion user input when the image appears to align with the physical object; when the completion user input is received, determine the inter-pupillary distance of the user; and calibrate the head mounted display device based on the inter-pupillary distance. The head-mounted display device may additionally or optionally include, wherein the instructions are executable by the processor to: display the image to a first eye of the user; and display blocking light to another eye of the user to obscure vision in the other eye.

The invention claimed is:

1. A head-mounted display device for determining an inter-pupillary distance of a user, comprising:
a see-through display providing both eyes of the user with a view of a physical object;
a processor; and
a non-volatile storage device holding instructions executable by the processor to:
select an image that corresponds to the physical object viewable by the user;
display the image to a first eye of the user at an offset to the physical object;
display blocking light to a second eye of the user to obscure vision in the second eye;
in response to alignment user input, move a position of the image relative to the physical object;
output an instruction to provide completion user input when the image aligns with the physical object;
when the completion user input is received, determine the inter-pupillary distance of the user; and
calibrate the head-mounted display device based on the inter-pupillary distance.

2. The head-mounted display device of claim 1, wherein the instructions are executable by the processor to capture the image with a camera of the head-mounted display device.

3. The head-mounted display device of claim 1, wherein the instructions are executable by the processor to retrieve the image from a storage.

4. The head-mounted display device of claim 1, wherein the instructions are executable by the processor to display a plurality of alignment icons, and wherein the alignment user input comprises user selection of one or more of the alignment icons via one or more of gesture input, gaze input and voice input.

5. The head-mounted display device of claim 1, wherein the instructions are executable by the processor to:
receive initial alignment user input that corresponds to moving the position of the image in a first direction;
in response, move the position of the image by an initial distance in the first direction;
subsequently receive subsequent alignment user input that corresponds to moving the position of the image in a second direction opposite to the first direction; and
in response, move the position of the image in the second direction by a subsequent distance that is less than the initial distance.

6. A method for determining an inter-pupillary distance of a user of a head-mounted display device, comprising:
selecting an image that corresponds to a physical object viewable by the user;
displaying the image to a first eye of the user at an offset to the physical object;
displaying blocking light to a second eye of the user to obscure vision in the second eye;
in response to receiving alignment user input, moving a position of the image relative to the physical object;
outputting an instruction to provide completion user input when the image aligns with the physical object;
when the completion user input is received, determining the inter-pupillary distance of the user; and
calibrating the head-mounted display device based on the inter-pupillary distance.

7. The method of claim 6, wherein capturing the image comprises capturing the image with a camera of the head-mounted display device.

8. The method of claim 6, further comprising retrieving the image from a storage.

9. The method of claim 6, further comprising displaying a plurality of alignment icons, and wherein the alignment user input comprises user selection of one or more of the alignment icons via one or more of gesture input, gaze input and voice input.

10. The method of claim 6, further comprising:
   receiving initial alignment user input that corresponds to moving the position of the image in a first direction;
   in response, moving the position of the image by an initial distance in the first direction;
   subsequently receiving subsequent alignment user input that corresponds to moving the position of the image in a second direction opposite to the first direction; and
   in response, moving the position of the image in the second direction by a subsequent distance that is less than the initial distance.

11. The head-mounted display device of claim 1, wherein the instructions are executable by the processor to display text that guides the user to the location of the physical object.

12. The method of claim 6, further comprising displaying text that guides the user to the location of the physical object.

13. The head-mounted display device of claim 2, wherein the instructions are executable by the processor to capture the image in response to receiving capture user input.

14. The head-mounted display device of claim 2, wherein the instructions are executable by the processor to capture the image by:
   programmatically detecting the physical object; and
   in response, programmatically capturing the image of the physical object.

15. The head-mounted display device of claim 1, wherein the instructions are executable by the processor to provide one or more of audio guidance and visual guidance that guides the user to the physical object.

16. The method of claim 7, further comprising capturing the image in response to receiving capture user input.

17. The method of claim 7, further comprising:
   programmatically detecting the physical object; and
   in response, programmatically capturing the image of the physical object with the camera.

18. The method of claim 6, further comprising providing one or more of audio guidance and visual guidance that guides the user to the physical object.

* * * * *